US009911452B2

(12) United States Patent
Suzuki et al.

(10) Patent No.: US 9,911,452 B2
(45) Date of Patent: Mar. 6, 2018

(54) MAGNETIC TAPE WINDING-UP METHOD, MAGNETIC TAPE WINDING-UP APPARATUS, MANUFACTURING METHOD OF MAGNETIC TAPE CARTRIDGE, AND MAGNETIC TAPE CARTRIDGE

(75) Inventors: Takayuki Suzuki, Kanagawa (JP); Tomohisa Ohba, Kanagawa (JP); Yasushi Hatano, Kanagawa (JP); Masatoshi Kouhara, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 554 days.

(21) Appl. No.: 13/487,440

(22) Filed: Jun. 4, 2012

(65) Prior Publication Data

US 2012/0305692 A1     Dec. 6, 2012

(30) Foreign Application Priority Data

Jun. 3, 2011   (JP) .................. 2011-124880

(51) Int. Cl.
| | | |
|---|---|---|
| *G11B 15/43* | (2006.01) | |
| *G11B 23/04* | (2006.01) | |
| *G11B 23/107* | (2006.01) | |
| *G11B 23/113* | (2006.01) | |
| *G11B 15/66* | (2006.01) | |

(52) U.S. Cl.
CPC .............. *G11B 15/43* (2013.01); *G11B 15/66* (2013.01); *G11B 23/042* (2013.01); *G11B 23/107* (2013.01); *G11B 23/113* (2013.01)

(58) Field of Classification Search
CPC ....... G11B 15/43; G11B 15/66; G11B 23/042; G11B 23/107; G11B 23/113

USPC ....... 242/413, 413.3, 419, 419.1, 420, 420.6
See application file for complete search history.

(56) References Cited

U.S. PATENT DOCUMENTS

| | | | | |
|---|---|---|---|---|
| 1,687,339 A | * | 10/1928 | Lewellen | 226/41 |
| 2,102,109 A | * | 12/1937 | Brueggemann | 242/154 |
| 2,104,656 A | * | 1/1938 | Krejci | 242/420.4 |
| 2,568,431 A | * | 9/1951 | Congdon | 242/413.6 |
| 2,743,878 A | * | 5/1956 | Masterson | G11B 5/54 242/352.4 |
| 2,981,491 A | * | 4/1961 | Eans, Jr. | 242/420.6 |
| 3,032,245 A | * | 5/1962 | George et al. | 226/39 |
| 3,177,749 A | * | 4/1965 | Best et al. | 83/208 |

(Continued)

FOREIGN PATENT DOCUMENTS

| | | | |
|---|---|---|---|
| JP | 56022248 A | * | 3/1981 |
| JP | 01021741 A | * | 1/1989 |

(Continued)

OTHER PUBLICATIONS

Office Action dated Feb. 12, 2014 issued by the Japanese Patent Office in counterpart Japanese Patent Application No. 2011-124880.

(Continued)

*Primary Examiner* — Michael E Gallion
(74) *Attorney, Agent, or Firm* — Sughrue Mion, PLLC (57) ABSTRACT

A winding-up method for winding up a magnetic tape, includes: winding up the magnetic tape around a takeup reel by laying turns one on top of another while causing the magnetic tape to run; and performing a tension control of maintaining tension exerted on a wound-up magnetic tape for a predetermined time.

14 Claims, 6 Drawing Sheets

(56) References Cited

U.S. PATENT DOCUMENTS

| | | | | |
|---|---|---|---|---|
| 3,323,736 A * | 6/1967 | Wolf | G11B 15/43 | 242/334.6 |
| 3,409,239 A * | 11/1968 | Siebert | G11B 15/16 | 226/181 |
| 3,443,812 A * | 5/1969 | Atsumi | G11B 15/10 | 242/333.4 |
| 3,452,945 A * | 7/1969 | Viegas | | 242/420.3 |
| 3,540,674 A * | 11/1970 | Okamura | | 242/147 R |
| 3,584,805 A * | 6/1971 | Lee | | 242/331.4 |
| 3,601,333 A * | 8/1971 | Buis | G03B 21/43 | 242/412.2 |
| 3,661,338 A * | 5/1972 | Becking | | 242/413.6 |
| 3,680,753 A * | 8/1972 | Shaw-Stewart | B65H 59/384 | 226/195 |
| 3,684,295 A * | 8/1972 | Strain | G11B 23/087 | 242/338.2 |
| 3,718,289 A * | 2/1973 | Alaimo | G11B 15/43 | 242/331.5 |
| 3,761,035 A * | 9/1973 | Wang | G11B 15/16 | 242/331.1 |
| 3,781,490 A * | 12/1973 | Phillips | | 360/71 |
| 3,829,038 A * | 8/1974 | Studer | G11B 15/43 | 242/334.1 |
| 3,940,080 A * | 2/1976 | Bennett | G11B 23/113 | 242/417.1 |
| 4,015,799 A * | 4/1977 | Koski et al. | | 242/334.4 |
| 4,063,139 A * | 12/1977 | Miller | G11B 15/02 | 242/331.3 |
| 4,080,635 A * | 3/1978 | Zahn et al. | | 360/71 |
| 4,097,005 A * | 6/1978 | Sieger | G11B 15/43 | 226/195 |
| 4,125,881 A * | 11/1978 | Eige | G11B 15/48 | 242/334.3 |
| 4,159,811 A * | 7/1979 | Grant | | 242/343.2 |
| 4,236,682 A * | 12/1980 | Barton, Jr. | G11B 15/662 | 242/332.7 |
| 4,256,270 A * | 3/1981 | Lee | G03C 1/74 | 242/420.6 |
| 4,256,996 A * | 3/1981 | Brooks | G11B 15/46 | 242/334.4 |
| 4,331,986 A * | 5/1982 | Mori | G11B 15/20 | 360/71 |
| 4,390,909 A * | 6/1983 | Sakamoto | G11B 15/43 | 360/71 |
| 4,407,331 A * | 10/1983 | Rehling | D03D 49/10 | 139/110 |
| 4,411,397 A * | 10/1983 | Karsh | G11B 15/28 | 226/1 |
| 4,423,588 A * | 1/1984 | Garcia | B65H 57/28 | 242/156.2 |
| 4,451,007 A * | 5/1984 | Ohkubo | B65H 54/553 | 242/476.1 |
| 4,457,474 A * | 7/1984 | Okamura | G11B 23/08728 | 242/344 |
| 4,500,817 A * | 2/1985 | Kudelski | | 318/7 |
| 4,530,471 A * | 7/1985 | Inoue | | 242/420.1 |
| 4,650,133 A * | 3/1987 | White et al. | | 242/412.3 |
| 4,696,439 A * | 9/1987 | Sukigara et al. | | 242/334.2 |
| 4,708,301 A * | 11/1987 | Kataoka | | 226/44 |
| 4,727,442 A * | 2/1988 | Clark | | 360/71 |
| 4,736,900 A * | 4/1988 | Okamura | B65H 23/1806 | 242/334.2 |
| 4,807,107 A * | 2/1989 | Fincher | G11B 15/46 | 242/334.6 |
| 4,951,895 A * | 8/1990 | Hirai | | 242/419.9 |
| 4,966,333 A * | 10/1990 | Bosch | | 242/412.3 |
| 4,997,120 A * | 3/1991 | Tanaka | B65H 23/1888 | 226/25 |
| 5,031,056 A * | 7/1991 | Okada | G11B 15/6653 | 360/74.3 |
| 5,032,936 A * | 7/1991 | Fujioka | G11B 15/467 | 242/334.2 |
| 5,039,027 A * | 8/1991 | Yanagihara | G11B 15/43 | 242/334.2 |
| 5,060,881 A * | 10/1991 | Bogucki-Land | | 242/413.1 |
| 5,251,834 A * | 10/1993 | Ikegami et al. | | 242/417 |
| 5,303,876 A * | 4/1994 | Suzuki | G11B 23/08721 | 242/343 |
| 5,310,124 A * | 5/1994 | Linari et al. | | 242/418.1 |
| 5,470,005 A * | 11/1995 | King et al. | | 226/1 |
| 5,477,400 A * | 12/1995 | Kawamata | G11B 15/43 | 242/334.3 |
| 5,540,398 A * | 7/1996 | Nishida et al. | | 242/334.2 |
| 5,637,405 A * | 6/1997 | Hara et al. | | 428/447 |
| 5,657,941 A * | 8/1997 | Simons et al. | | 242/420.6 |
| 5,659,229 A * | 8/1997 | Rajala | B65H 23/048 | 226/195 |
| 5,671,895 A * | 9/1997 | Cederholm et al. | | 242/420.6 |
| 5,718,394 A * | 2/1998 | Simons | B65H 23/185 | 242/420.6 |
| 5,725,168 A * | 3/1998 | Yokoyama et al. | | 242/334.6 |
| 5,950,956 A * | 9/1999 | Yukitake | | 242/447.1 |
| 6,082,657 A * | 7/2000 | Chen et al. | | 242/420.6 |
| 6,164,583 A * | 12/2000 | Spatafora | | 242/420.6 |
| 6,645,648 B2 * | 11/2003 | Doushita et al. | | 428/845.5 |
| 6,819,065 B1 * | 11/2004 | Howarth | G11B 15/48 | 242/225 |
| 7,011,899 B2 * | 3/2006 | Kato | | 428/845.2 |
| 8,720,812 B2 * | 5/2014 | Liu et al. | | 242/412.2 |
| 8,770,874 B2 * | 7/2014 | McNestry et al. | | 400/236 |
| 2003/0170498 A1 * | 9/2003 | Inoue | G11B 5/735 | 428/845.4 |
| 2004/0041048 A1 * | 3/2004 | Karp | G11B 15/54 | 242/334.4 |
| 2011/0102938 A1 * | 5/2011 | Bates | G11B 15/026 | 360/78.02 |
| 2012/0305692 A1 * | 12/2012 | Suzuki et al. | | 242/334 |

FOREIGN PATENT DOCUMENTS

| | | | |
|---|---|---|---|
| JP | 02246039 A | * | 10/1990 |
| JP | 2004307091 A | | 11/2004 |
| JP | 2006-048733 A | | 2/2006 |
| JP | 2006048733 A | * | 2/2006 |
| JP | 4037292 B2 | | 1/2008 |

OTHER PUBLICATIONS

Communication from the Japanese Patent Office dated May 14, 2013, in a counterpart application No. 2011-124880.

* cited by examiner

MAGNETIC TAPE WINDING-UP METHOD, MAGNETIC TAPE WINDING-UP APPARATUS, MANUFACTURING METHOD OF MAGNETIC TAPE CARTRIDGE, AND MAGNETIC TAPE CARTRIDGE

CROSS-REFERENCE TO RELATED APPLICATIONS

This application claims the benefit of Japanese Patent Application JP2011-124880, filed Jun. 3, 2011, the entire content of which is hereby incorporated by reference, the same as if set forth at length.

FIELD OF THE INVENTION

The present invention relates to a magnetic tape winding-up method, a magnetic tape winding-up apparatus, a manufacturing method of a magnetic tape cartridge, and a magnetic tape cartridge.

BACKGROUND OF THE INVENTION

Magnetic tapes are used as recording media for backup of computer data. Among magnetic tapes are ones which are configured in such a manner that a primer layer and a magnetic layer are laid on a base film and a back coat layer is formed on the surface, opposite to the surface on which the magnetic layer is formed, of the base film.

A magnetic tape is used being housed in a magnetic tape cartridge. For example, the magnetic tape cartridge is composed of a tape reel around which the magnetic tape is wound and a cartridge body which houses the tape reel.

In assembling a magnetic tape cartridge, a magnetic tape raw roll which has been manufactured in advance is slit into magnetic tapes and each of those magnetic tapes is wound up around the tape reel of a magnetic tape cartridge by a winding-up apparatus.

When a magnetic tape has been wound up around a tape reel by the winding-up apparatus, an air layer (what is called an air film) may be formed between adjoining turns of the wound-up magnetic tape. An air layer is formed through mixing of air that exists in the vicinity of a running portion of a magnetic tape being wound. If air layers are formed, the tightness of winding of a wound-up magnetic tape may be reduced when the tension that has been exerted on the magnetic tape during the winding is released after the completion of wounding-up around the tape reel. In such an event, after the magnetic tape cartridge is inserted into a drive device, an error may occur in a loading operation of pulling the magnetic tape into the drive device out of the magnetic tape cartridge or a magnetic recording or reproducing operation of the drive device.

In the winding-up apparatus disclosed in JP-A-2004-307091, when a magnetic tape is wound, the surface of a winding subject portion of the magnetic tape is pressed inward against a tape reel by a pressing mechanism to prevent inclusion of air through association with a running portion of the magnetic tape.

SUMMARY OF THE INVENTION

Incidentally, in recent years, the recording capacity and density of magnetic tapes have increased and, to these ends, the thinning of the magnetic layer and the smoothing of the surface of the back coat layer of magnetic tapes have advanced. However, this increases the influence of air layers each of which is formed between the magnetic layer formed on a surface of a turn of a wound-up magnetic tape and the back coat layer formed on the surface, on the side opposite to side of the former surface, of the turn laid on the former turn. That is, since the sizes of projections formed on a smoother surface are small, adjoining portions of the magnetic layer and the back coat layer tend not to contact with each other to weaken the frictional force, whereby a wound-up magnetic tape may be loosened.

JP-A-2004-307091 discloses the technique of pressing the surface of a winding subject portion of a magnetic tape inward against a tape reel by a pressing mechanism and thereby eliminating air that accompanies a running portion of the magnetic tape when the magnetic tape is wound. However, as the smoothing of magnetic tapes advances, preventing inclusion of air merely by the pressing mechanism comes to cause other problems such as deformation of a core. Furthermore, in the case of winding-up using flanges, it is practically difficult to dispose a pressing mechanism.

The present invention has been made in view of the above circumstances, and provides a magnetic tape winding-up method, a magnetic tape winding-up apparatus, a manufacturing method of a magnetic tape cartridge, and a magnetic tape cartridge which make it possible to prevent loosening of a wound-up magnetic tape.

(1) A winding-up method for winding up a magnetic tape, comprising the steps of:

winding up the magnetic tape around a takeup reel by laying turns one on top of another while causing the magnetic tape to run; and performing a tension control of maintaining tension exerted on a wound-up magnetic tape for a predetermined time.

(2) A winding-up method for winding up a magnetic tape, comprising the steps of:

winding up the magnetic tape around a takeup reel by laying turns one on top of another while causing the magnetic tape to run; and performing a running speed control of setting a running speed of the magnetic tape lower than a threshold speed.

(3) A manufacturing method of a magnetic tape cartridge, wherein:

a tape reel around which a magnetic tape has been wound up by the winding-up method of item (1) or (2) is incorporated in a cartridge; or a magnetic tape is wound up around a tape reel incorporated in a cartridge in advance by the winding-up method of item (1) or (2).

(4) A winding-up apparatus for winding up a magnetic tape, comprising:

a winding-up mechanism for winding up the magnetic tape around a takeup reel by laying turns one on top of another while causing the magnetic tape to run; and a control unit for performing a tension control of maintaining tension exerted on a wound-up magnetic tape for a predetermined time or a running speed control of setting a running speed of the magnetic tape lower than a threshold speed during winding.

(5) A magnetic tape cartridge to incorporate a magnetic tape, comprising:

a cartridge body;

a tape reel which is housed in the cartridge body and around which the magnetic tape is to be wound up; and a storage unit which is disposed in the cartridge body, is capable of wireless communication, and is stored with information which can be read by the winding-up apparatus according to item (4) and indicating a type of the magnetic tape.

The invention can provide a magnetic tape winding-up method, a magnetic tape winding-up apparatus, a manufacturing method of a magnetic tape cartridge, and a magnetic tape cartridge which make it possible to prevent loosening of a wound-up magnetic tape.

DETAILED DESCRIPTION OF THE INVENTION

Figure 1:
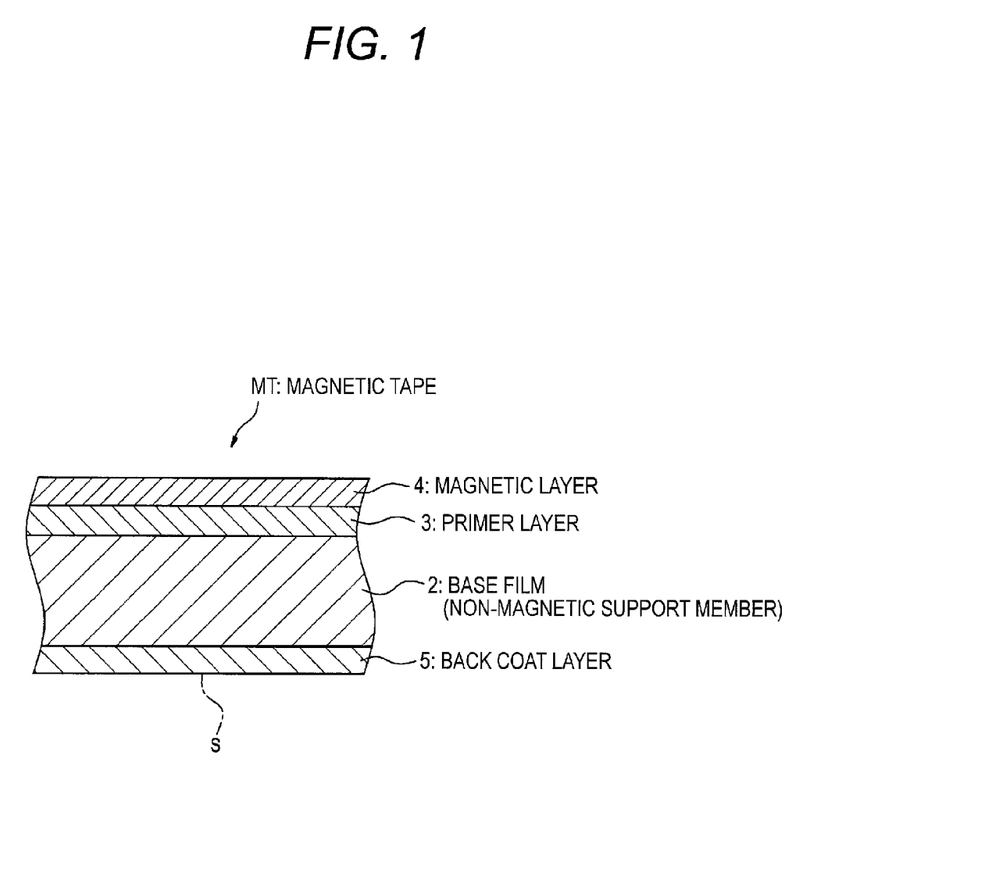
FIG. 1 is a schematic sectional view showing the structure of a magnetic tape.

FIG. 1 is a schematic sectional view showing the structure of a magnetic tape MT.

The magnetic tape MT shown in FIG. 1 is one used as, for example, a backup recording medium of a computer. The magnetic tape MT has a non-magnetic base film (non-magnetic support member) 2, a primer layer 3 formed on one surface of the base film 2, a magnetic layer 4 formed on the primer layer 3, and a back coat layer 5 formed on the other surface of the base film 2.

The base film 2 may be a known film, example materials of which are polyesters such as polyethylene terephthalate (PET) and polyethylene naphthalate, polyolefins, cellulose triacetate, polycarbonate, polyamide (most preferably aromatic polyamide), polyimide, polyamideimide, polysulfone, aramid, polyphenyl sulfone, and polybenzoxazole (PBO).

The primer layer 3, which is formed between the base film 2 and the magnetic layer 4, has a role of increasing the adhesion between the base film 2 and the magnetic layer 4. The primer layer 3 is formed by using a binder, carbon black, titanium oxide, iron oxide, non-magnetic particles of alumina or the like, and other materials.

The magnetic layer 4 is formed by using magnetic particles and a binder as indispensable components, and enables recording of a data signal in the form of magnetic variations and reproduction of a data signal which is performed by reading such magnetic variations with a magnetic head.

To enables high-density recording, it is preferable that the magnetic particles as a component of the magnetic layer 4 be a ferromagnetic metal powder or a hexagonal ferrite magnetic powder. The ferromagnetic metal powder is a needle-shaped, Fe-based alloy powder containing Co, Mn, Ni, Sm, Nb, etc.

The back coat layer 5 is formed on that surface of the base film 2 which is opposite to the surface on which the magnetic layer 4 is formed, and serves to increase the running durability of the magnetic tape MT. It is preferable that the back coat layer 5 contain a binder and carbon black.

The surface S of the back coat layer 5 is formed with very small projections which are mainly made of carbon black.

The magnetic tape MT may also have a layer (s) other than the above-described primer layer 3, magnetic layer 4, and back coat layer 5. For example, any of a second magnetic layer, a cushion layer, an overcoat layer, an adhesive layer, and a protective layer may also be formed.

An example manufacturing method of the magnetic tape MT will be described below. A base film 2 which is wider than the magnetic tape MT to be manufactured is prepared, and a web which is produced by forming the above-described layers on the base film 2 in coating processes is wound up to form a raw roll. The raw roll is slit into magnetic tapes having a prescribed width in a slit process. A servo signal is recorded in the magnetic layer 4 of each of the thus-formed magnetic tapes in a servo process. The manufacturing method of the magnetic tape MT is not limited to the above one and may be any known method.

Next, a winding-up process will be described. Using a winding-up apparatus (described later), the magnetic tape MT is caused to run at a prescribed speed and wound up around a tape reel while prescribed tension is exerted on a running portion of the magnetic tape MT. The magnetic tape MT is wound up (turns are stacked) in such a manner that the ends, on each side in the width direction, of the respective turns of the magnetic tape MT are flush with each other.

Next, a relationship between an air layer formed in a wound-up magnetic tape MT and the surface of the back coat layer 5.

Figure 2A:
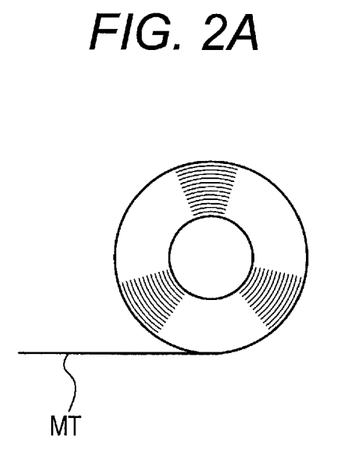
FIGS. 2A, 2B and 2C show wound-up magnetic tapes.
Figure 2B:
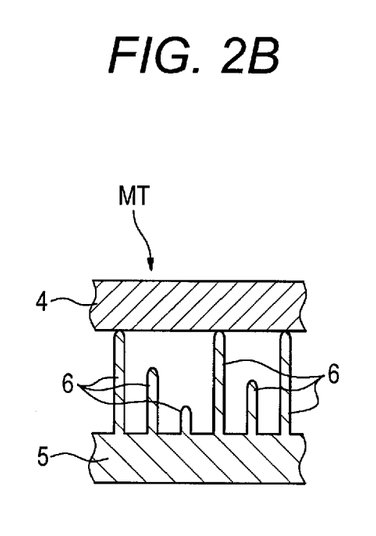
Figure 2C:
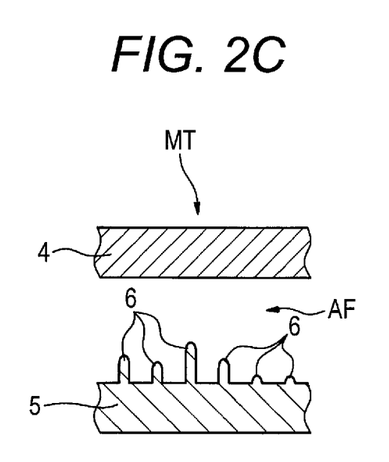

FIGS. 2A, 2B and 2C show wound-up magnetic tapes MT. More specifically, FIG. 2A is a plan view of a wound-up magnetic tape MT, and each of FIGS. 2A and 2B is a schematic sectional view of part of a magnetic tape MT, that is, part of the magnetic layer 4 formed on a surface of a turn of the magnetic tape MT and part of the back coat layer 5 formed on the surface, on the side opposite to the side of the former surface, of the turn wound on the former turn.

In the magnetic tape MT shown in FIG. 2B, the surface of the back coat layer 5 is rough, that is, sizes of projections 6 formed on the surface of the back coat layer 5 are larger on average than in the magnetic tape MT shown in FIG. 2C. Therefore, in the magnetic tape MT shown in FIG. 2B, a large number of projections 6 are in contact with the surface of the adjacent magnetic layer 4 when the magnetic tape MT is wound up as shown in FIG. 2A.

On the other hand, in the magnetic tape MT shown in FIG. 2C, the surface of the back coat layer 5 is smooth, that is, sizes of projections 6 formed on the surface of the back coat layer 5 are small on average than in the magnetic tape MT shown in FIG. 2B. Therefore, in the magnetic tape MT shown in FIG. 2C, only a small number of projections 6 are in contact with the surface of the adjacent magnetic layer 4 when the magnetic tape MT is wound up as shown in FIG. 2A. In the magnetic tape MT shown in FIG. 2C, a gap is formed between the surfaces of the magnetic layer 4 and the back coat layer 5 in a region where no projections 6 are in contact with the adjacent magnetic layer 4.

In the magnetic tapes MT shown in FIGS. 2B and 2C, sizes of projections 6 formed on the surface of the back coat layer 5 are smaller on average and the number of projections existing in a prescribed area is smaller when the surface of the back coat layer 5 is smoother.

Therefore, it is presumed that, in the magnetic tape MT shown in FIG. 2C, the frictional force between the magnetic layer 4 and the back coat layer 5 is weak and a wound-up magnetic tape MT tends to be loosened due to presence of air layers AF when tension exerted on the magnetic tape MT is released after the winding-up.

It is known that loosening of a wound-up magnetic tape MT is more prone to occur in its outer peripheral turns. The inventors think that this is because air escapes from air layers AF formed in inner peripheral turns as the winding-up proceeds and air is expelled from those air layers AF by pressure that is exerted from outer peripheral turns, so that the air layers AF become so thin that sufficient frictional force is produced.

A method for estimating a thickness of air layers AF formed in a wound-up magnetic tape MT is as follows. A winding thickness of a wound-up magnetic tape MT is measured and a thickness of all air layers AF is calculated by subtracting, from the measured winding thickness, a value obtained by multiplying the thickness of the magnetic tape MT by the number of turns. A thickness of each air layer AF is calculated by dividing the thickness of all the air layers AF by the number of intervals between adjoining turns (i.e., the number of turns minus 1). If a magnetic tape MT is wound up in such a manner that turns with air layers AF that are not thin enough to produce frictional force are stacked on turns with air layers AF that are thin enough to produce frictional force, only the former turns should be taken into consideration in estimating a thickness of air layers AF.

Figure 3:
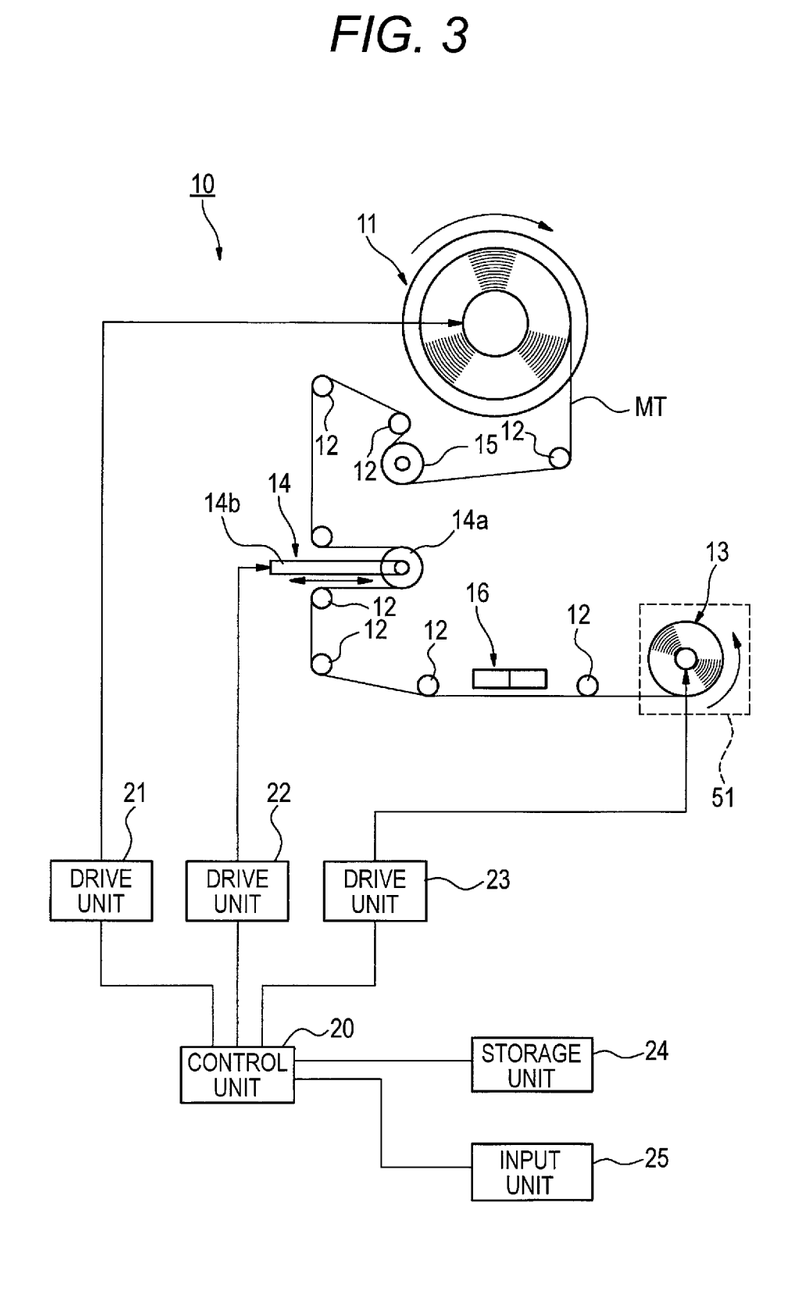
FIG. 3 outlines the configuration of a magnetic tape winding-up apparatus.

FIG. 3 outlines the configuration of a magnetic tape winding-up apparatus 10.

The winding-up apparatus 10 is an apparatus for winding up part of a magnetic tape MT produced by slitting around a takeup reel 13 in a magnetic tape manufacturing process and is also called a winder. The takeup reel 13 corresponds to a tape reel that is housed in a magnetic tape cartridge.

The winding-up apparatus 10 is equipped with a supply reel 11, the takeup reel 13, a tension adjusting unit 14, a length detection roller 15, and a tape end processing unit 16.

The supply reel 11 holds a magnetic tape MT produced by slitting and wound around itself, and feeds the magnetic tape MT toward the takeup reel 13.

Part of the magnetic tape MT that is fed from the supply reel 11 is wound around the takeup reel 13. After the magnetic tape MT has been wound up around the takeup reel 13, the takeup reel 13 serves as a tape reel housed in a cartridge body of a magnetic tape cartridge 51.

The winding-up apparatus 10 first manufactures a magnetic tape cartridge 51 that houses a tape reel around which no magnetic tape MT is wound up, and then winds up a magnetic tape MT around the tape reel (used as the takeup reel 13) of the thus-manufactured magnetic tape cartridge 51. Alternatively, a magnetic tape cartridge 51 may be assembled after winding up a magnetic tape MT around the takeup reel 13 and housing the takeup reel 13 in a cartridge body as a tape reel.

In running from the supply reel 11 toward the takeup reel 13, the magnetic tape MT is guided by plural guide rollers 12 which are arranged in the winding-up apparatus 10.

The tension adjusting unit 14 performs an operation of exerting prescribed tension on a running portion of the magnetic tape MT and an operation of releasing the tension. The tension adjusting unit 14 is equipped with a roller 14a which is held rotatably and an arm 14b for moving the roller 14a between a position where the roller 14a is in sliding contact with the surface of a portion, running on the roller 14a itself, of the magnetic tape MT and a position where the roller 14a is separated from the surface of a portion, adjacent to the roller 14a itself, of the magnetic tape MT. The tension adjusting unit 14 adjusts the tension exerted on a running portion of the magnetic tape MT by pressing the roller 14a against the surface of an associated portion of the magnetic tape MT by moving the arm 14b. The configuration of the tension adjusting unit 14 is not limited to the above and another configuration may be employed as long as it can exert prescribed tension on the magnetic tape MT and release the tension.

The length detection roller 15, which is rotatable and has a cylindrical shape, is rotated as the magnetic tape MT runs because its outer circumferential surface is in contact with a running portion of the magnetic tape MT. The winding-up apparatus 10 detects a running length of the magnetic tape MT by detecting the number of rotations of the length detection roller 15 by means of a number-of-rotations detecting unit (not shown). The detected running length of the magnetic tape MT is output to a control unit 20 (described later) as data.

The tape end processing unit 16 cuts the magnetic tape MT when the magnetic tape MT has been wound around the takeup reel 13 by a predetermined winding length. The tape end processing unit 16 may be equipped with any of a mechanism for absorbing and holding a tape end portion of the separated part of the magnetic tape MT, a mechanism for forming a leader portion (described later) in an end portion of the separated part of the magnetic tape MT, and a mechanism for feeding a tape end portion held in the tape end processing unit 16 to the takeup reel 13.

The winding-up apparatus 10 is also equipped with drive units 21-23, a storage unit 24, an input unit 25, and the control unit 20.

The drive unit 21 causes the supply reel 11 to feed the magnetic tape MT by rotating the supply reel 11 by driving it.

The drive unit 22 drives the arm 14b of the tension adjusting unit 14 and thereby causes the tension adjusting unit 14 to perform an operation of exerting tension on a running portion of the magnetic tape MT and an operation of releasing tension.

The drive unit 23 drives and rotates the takeup reel 13 and thereby winds part of the magnetic tape MT around the takeup reel 13.

The storage unit 24 is stored with, as data, pieces of information (described later) that are necessary for winding-up processing such as a type of magnetic tape MT.

The input unit 25 is to allow a user to make an input to cause the winding-up apparatus 10 to perform desired processing. For example, a user can give an instruction to start winding-up of part of the magnetic tape MT through the input unit 25.

The control unit 20 controls the drive units 21-23, the storage unit 24, and the input unit 25 in a unified manner. The control unit 20 controls the tension of a running portion of the magnetic tape MT by controlling the tension adjusting unit 14. During a winding-up operation, the control unit 20 controls the running speed of the magnetic tape MT by controlling the drive units 21 and 23. The control unit 20 may further control, after the end of a winding-up operation, an operation that the tape end processing unit 16 cuts the magnetic tape MT at the end of a winding-up operation and an operation of housing an end portion of the separated part of the magnetic tape MT in the magnetic tape cartridge 51 which houses the takeup reel 13.

Next, a procedure for winding-up part of a magnetic tape MT using the winding-up apparatus 10 shown in FIG. 3 will be described.

Figure 4:
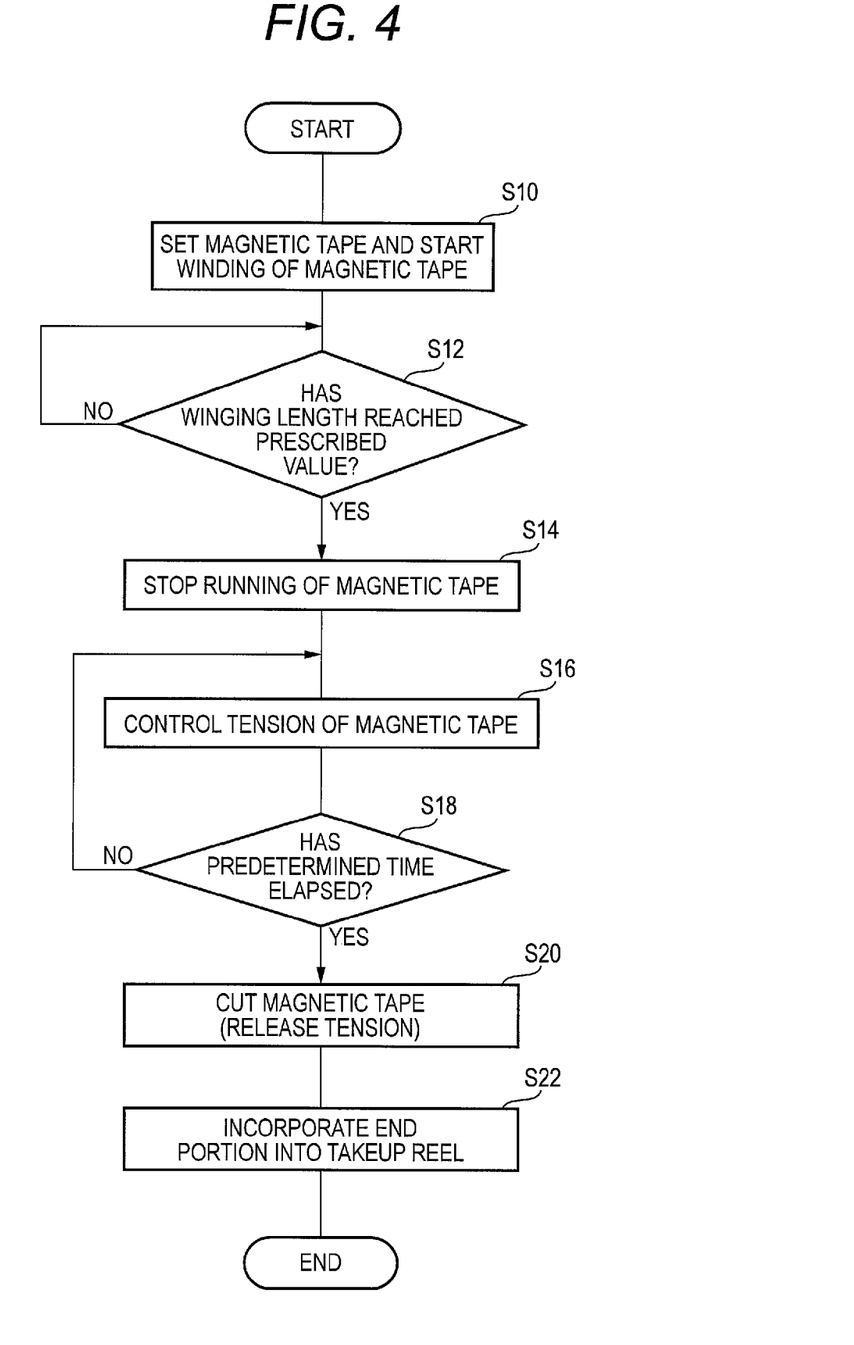
FIG. 4 is a flowchart of a procedure for winding up part of a magnetic tape using the winding-up apparatus of FIG. 3.

FIG. 4 is a flowchart of the procedure for winding up part of a magnetic tape MT.

First, at step S10, a supply reel 11 around which a magnetic tape MT which was produced by slitting in advance is wound up is set in the winding-up apparatus 10. A tip portion, in the running direction, of the magnetic tape MT is pulled out of the supply reel 11 and fixed to the takeup reel 13. At the same time, the magnetic tape MT is put on the plural guide rolls 12 and the tension adjusting unit 14 is set in an initial state. Then, running of the magnetic tape MT is started by rotating the supply reel 11 and the takeup reel 13. The tension exerted on the magnetic tape MT is controlled to a prescribed value by the control unit 20.

At step S12, the control unit 20 judges whether or not the winding length of the magnetic tape MT has reached a prescribed value on the basis of an output of the length detection roller 15. If judging at step S12 that the winding length has reached the prescribed value, at step S14 the control unit 20 stops the running of the magnetic tape MT by stopping the rotation of the supply reel 11 and the takeup reel 13 by stopping the driving of the drivers 21 and 23.

At steps S16 and S18, the control unit 20 controls the tension adjusting unit 14 to perform a control of maintaining the tension exerted on the portion stretched between the supply reel 11 and the takeup reel 13 of the magnetic tape MT for a predetermined time (running is stopped). This control is called a tension control. As a result of the tension control, air escapes from air layers formed in the wound-up part of the magnetic tape MT, whereby the air layers are made so thin that frictional force is produced.

The above-mentioned predetermined time is a time that is long enough for the air layers to become so thin that frictional force is produced. Times that are long enough for air layers to become so thin that frictional force is produced and air layer thicknesses are measured in advance for each of surface roughness values of the back coat layers of magnetic tapes MT to be wound up while the running speed of the magnetic tape MT and the tension exerted on the magnetic tape MT are varied. Data to be used for determining the "predetermined time" are generated on the basis of measurement results.

If judging at step S18 that the predetermined time has elapsed, at step S20 the control unit 20 causes the tape end processing unit 16 to cut the magnetic tape MT and releases the tension exerted on the separated part of the magnetic tape MT (the tension is made zero).

At step S22, an end portion of the separated part of the magnetic tape MT is incorporated into the takeup reel 13. The procedure for winding up part of the original magnetic tape MT is thus completed.

According to the above procedure, since the control of maintaining the tension to make air layers thinner is performed instead of releasing the tension after winding-up of a magnetic tape MT, the wound-up magnetic tape MT is prevented from being loosened at portions where a thick air layer is formed when the tension is released. For example, when a magnetic tape MT is wound up in which the surface of the back coat layer 5 is formed with projections whose heights as measured by an atomic force microscope are smaller than or equal to 100 nm and the density of projections that are formed on the surface of the back coat layer 5 and whose heights as measured by an atomic force microscope are 25 to 100 nm is 23 to 1,000 per 90μm square, the probability of occurrence of loosening varies steeply from 40% to 5% at a tension maintaining time of 5 sec. It is therefore preferable that the tension be maintained for 5 sec or more. Also when back coat layers 5 that are rougher than the back coat layers 5 of the above example are used, loosening would be prevented by setting the tension maintaining time at 5 sec or more. It is presumed that longer tension maintaining times are necessary for magnetic tapes MT whose back coat layers 5 are smoother than in the above example.

In the above procedure, the tension control is performed only for the predetermined time from a time point of completion of winding-up of the magnetic tape MT. However, whether or not thick air layers are formed in that part of the magnetic tape MT which has been wound up at a certain time point may be judged by detecting a running speed of the magnetic tape MT and tension exerted on the magnetic tape MT at that time point and comparing the detected values with values that were measured as described above. That is, the start point of a tension control need not always be a time point of completion of winding-up and a tension control may be performed for a predetermined time (described above) starting from a certain time point in a winding-up operation. For example, a tension maintaining time is known for each position (end position) of that part of the magnetic tape MT which has been wound up at a certain time point. Therefore, loosening can be prevented at every position of the magnetic tape MT by determining a tension maintaining time for every position of the magnetic tape MT and performing a tension control for the determining time. In this case, it is not necessary to suspend winding of the magnetic tape MT during a tension control period; the tension maintaining time may elapse while the magnetic tape MT is wound.

The control unit 20 can measure a running speed of the magnetic tape MT being wound using an output of the length detection roller 15. And the control unit 20 can measure tension exerted on the magnetic tape MT being wound using an output of a potentiometer or the like (not shown) which detects a position of the arm 14b of the tension adjusting unit 14. If the running speed or tension is controlled according to a prescribed rule, a running speed or tension may be estimated according to the prescribed rule.

In the winding-up apparatus 10, data obtained in advance through measurements and indicating relationships between the running speed and the tension of a magnetic tape MT and the tension maintaining time can be stored in the storage unit 24. A tension maintaining time can be set by comparing a detected running speed and tension value with the data obtained in advance that are read from the storage unit 24. When the type of a magnetic tape MT is changed, a tension control suitable for the new type of magnetic tape MT may be performed by acquiring information relating to it from a tag 60 (described later). This makes it possible to reduce the tension maintaining time to a minimum necessary time.

Next, a description will be made of a method for preventing loosening of a wound-up part of a magnetic tape MT by controlling the running speed of the magnetic tape MT being wound.

First, a description will be made of a relationship between the running speed of a magnetic tape MT being wound and the loosening of a wound-up magnetic tape MT.

The running speed of a magnetic tape MT being wound influences air layers formed therein. More specifically, when the running speed is high, a large amount of air accompanies a running portion of the magnetic tape MT and hence a thicker air layer tends to be formed. On the other hand, when the running speed is low, even if an air layer is formed, it tends to be thin.

Under a condition that the surface roughness of the back coat layer 5 of a magnetic tape MT is constant, when the tension is released after completion of winding-up of a magnetic tape MT, a slip is more prone to occur at the boundary between adjoining surfaces of the magnetic tape MT (i.e., the boundary between the surfaces of a magnetic layer 4 and a back coat layer 5 that are adjacent to each other) and hence the wound-up magnetic tape MT is more liable to be loosened as the thickness of air layers increases.

That is, there is a phenomenon that, under the condition that the surface roughness of the back coat layer 5 of a magnetic tape MT is constant, a magnetic tape MT is loosened when the running speed of a magnetic tape MT being wound is higher than a certain value and is not loosened when the running speed of a magnetic tape MT being wound is lower than the certain value. In the following, a running speed of a magnetic tape MT being wound as a reference relating to occurrence of loosening of a magnetic tape MT is used as a running speed threshold value.

To this end, before each type of magnetic tape MT is wound up actually, a running speed threshold value is measured by an experiment. To measure a running speed threshold value, an experiment is carried out in which the same magnetic tape MT is wound up plural times at different running speeds. The tension is released after each winding-up operation and it is checked whether or not the magnetic tape MT has been loosened. In this manner, a running speed threshold value below which the magnetic tape MT is not loosened is determined. The smoothness of the surface of the back coat layer 5 (i.e., the height and distribution of projections) depends on the type of magnetic tape MT. Therefore, a running speed threshold value is determined for each type of magnetic tape MT by carrying out the above-described experiment for each type of magnetic tape MT. It is preferable that data of thus-determined running speed threshold values be stored in the storage unit 24 of the winding-up apparatus 10 shown in FIG. 3. A thus-determined running speed threshold value may be stored in a tag 60 (capable of wireless communication) of a magnetic tape cartridge 51 (described later).

Figure 5:
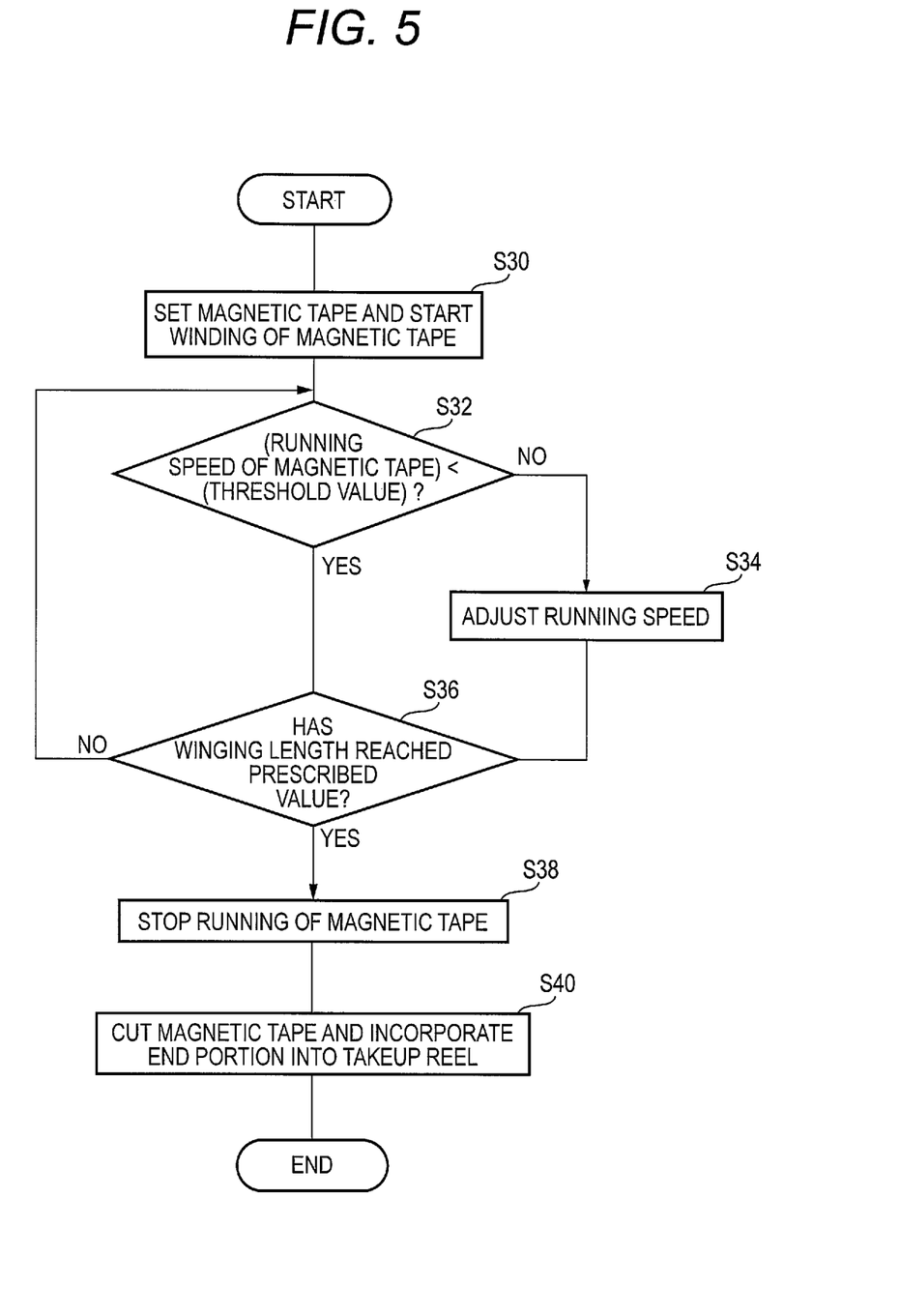
FIG. 5 is a flowchart of a procedure for winding up part of a magnetic tape using the winding-up apparatus of FIG. 3, the procedure including steps of controlling the running speed of the magnetic tape.

Next, a procedure for controlling the running speed of a magnetic tape MT when it is wound up using the winding-up apparatus 10 shown in FIG. 3 will be described with reference to FIG. 5.

First, at step S30, as at step S10 of the procedure shown in FIG. 4, a magnetic tape MT is set and its running is started. Tension that is exerted on the magnetic tape MT is controlled to a constant value by the control unit 20.

While the magnetic tape MT is being wound, the control unit 20 detects its running speed. At step S32, the control unit 20 reads a running speed threshold value from the storage unit 24 of the magnetic tape MT and judges whether or not the detected running speed is lower than the threshold value.

If judging at step S32 that the detected running speed is higher than or equal to the threshold value, at step S34 the control unit 20 adjusts the running speed of the magnetic tape MT to a speed that is lower than the threshold value by adjusting the rotation speeds of the supply reel 11 and the takeup reel 13 by controlling the drive units 21 and 23.

At step S36, the control unit 20 judges whether or not the winding length of the magnetic tape MT has reached a prescribed value on the basis of an output of the length detection roller 15. If judging at step S36 that the winding length has reached the prescribed value, at step S38 the control unit 20 stops the running of the magnetic tape MT. At step S40, the tape end processing unit 16 cuts the magnetic tape MT at a prescribed position and an end portion of the separated part of the magnetic tape MT is incorporated into the takeup reel 13. The procedure for winding up part of the original magnetic tape MT is thus completed.

If judging at step S36 that the winding length has not reached the prescribed value, the control unit 20 continues the winding of the magnetic tape MT and again judges at step S32 whether or not the running speed of the magnetic tape MT is lower than the threshold value.

In view of the fact that loosening of a wound-up magnetic tape MT is more prone to occur in its outer peripheral turns, the running speed control may be performed only during a prescribed period that belongs to the latter half of a winding-up period of the magnetic tape MT. In this case, to shorten the winding-up time of the magnetic tape MT, the magnetic tape MT is caused to run at a constant speed from the start of a winding-up operation to a certain time point and a running speed control is performed from that time point so that the running speed is lower than the threshold value.

Although the above-described winding-up apparatus 10 is a winder, the winding-up apparatus is not limited to a winder and the concept of the embodiment can be applied to any apparatus having a mechanism of winding up a magnetic tape MT around a tape reel or the like.

Next, a description will be made of the configuration of a magnetic tape cartridge which houses a magnetic tape MT and enables winding-up of a magnetic tape MT with use of a winding-up apparatus.

Figure 6:
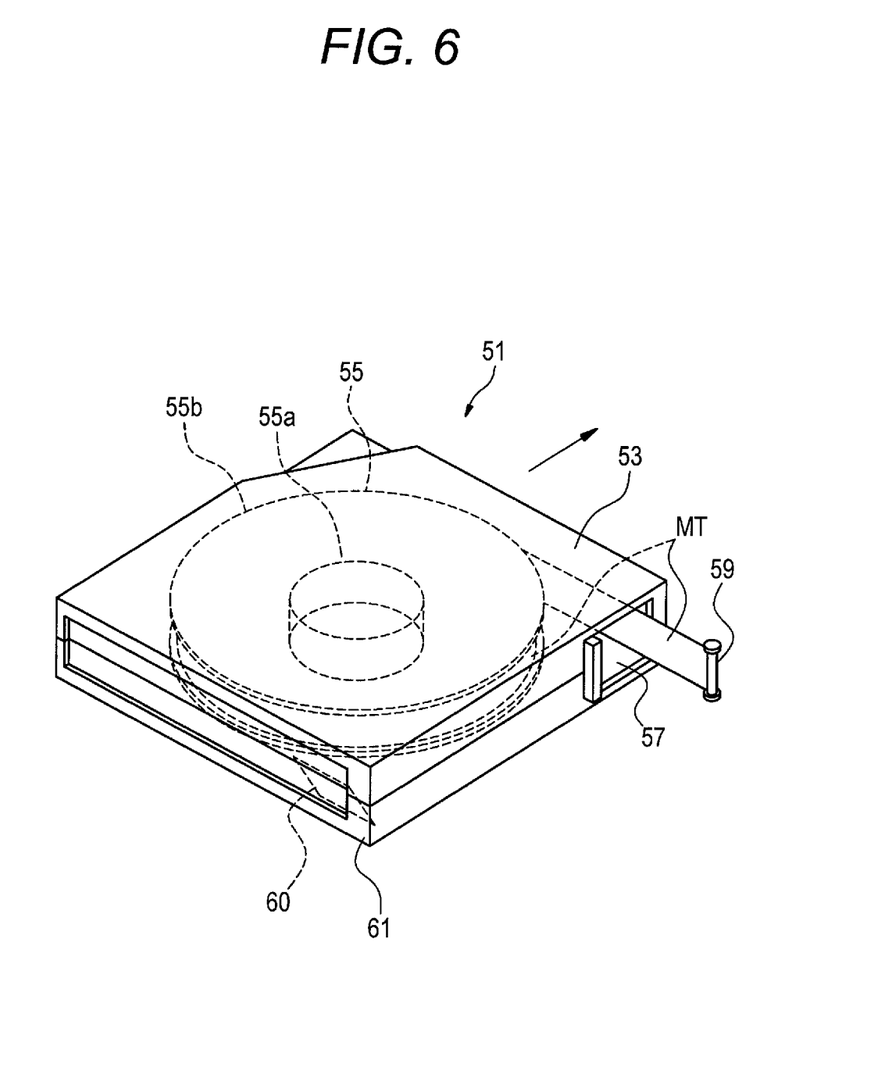
FIG. 6 is a perspective view showing the configuration of a magnetic tape cartridge.

FIG. 6 is a perspective view showing the configuration of a magnetic tape cartridge 51.

The magnetic tape cartridge 51 is equipped with a cartridge body 53 and a single tape reel 55 which is housed in the cartridge body 53 and around which a magnetic tape MT is wound up. The cartridge body 53 is constructed by joining a pair of members called shells to each other.

The tape reel 55 has a cylindrical hub 55a and two concentric flanges 55b which extend from the circumferences of the two respective end portions of the hub 55a. The magnetic tape MT is wound up around the outer circumferential surface of the hub 55a of the tape reel 55 as a result of laying turns one on top of another.

When the magnetic tape cartridge 51 is inserted into a drive device in the direction indicated by the arrow in FIG. 6, a window 57 which is formed in the cartridge body 53 on the side of its head in the insertion direction and a leader member 59 which is attached to the tip of the magnetic tape MT is pulled out through the window 57 by a loading unit of the drive device. Then, the magnetic tape MT is extended along a prescribed tape path in the drive device and information is written to or read from the magnetic layer 4 of the magnetic tape MT.

A back surface 61, located on the origin side of the arrow, of the cartridge body 53 of the magnetic tape cartridge 51 has an area where a cartridge label is to be attached. A tag 60 is disposed inside the cartridge body 53 at a position close to the back surface 61.

The tag 60 is an RFID (radio frequency identification) tag having a wireless communication antenna and can communicate with a reader/writer which is provided outside the magnetic tape cartridge 51 using a magnetic field or electromagnetic waves. Information reading, writing, and rewriting can be performed on and electric power can be supplied to the RFID tag 60 through a wireless communication with a reader/writer which is provided outside the magnetic tape cartridge 51.

The tag 60 is stored with pieces of information indicating a type (which corresponds to a specification and particulars of the magnetic tape MT) and a configuration of the magnetic tape MT. These pieces of information include information indicating the roughness of the surface of the back coat layer 5 of the magnetic tape MT. For example, the information indicating the roughness of the surface of the back coat layer 5 is a numerical value representing surface roughness of the back coat layer 5, the number of projections that exist in a unit area of the back coat layer 5 and whose heights are greater than or equal to a prescribed value, or an area ratio of the projections. Where the degree of roughness of the surface of the back coat layer 5 can be represented by a classification symbol such as a rank on the basis of the magnitude of the above numerical value, the information indicating the roughness of the surface of the back coat layer 5 maybe such a classification symbol.

The winding-up apparatus 10 may have a table showing a relationship between the type of magnetic tape MT and the roughness of the surface of its back coat layer 5 so that the winding-up apparatus 10 can acquire information indicating the roughness of the surface of the back coat layer 5 from a type of magnetic tape MT by reading the tag 60 and perform a tension control or a running speed control on the basis of the thus-acquired information.

With the above measures, if the winding-up apparatus 10 is equipped with a reading device such as a general-purpose reader/writer, the winding-up apparatus 10 can read out, with the reading device, the information stored in the tag 60 which is disposed in the cartridge body 53 which houses the tape reel 55 in winding up part of a magnetic tape MT around the tape reel 55. The control unit 20 can perform winding-up of part of the magnetic tape MT by selecting a tension maintaining time or a running speed threshold value that was determined in advance by measurement according to the read-out information of the magnetic tape MT.

The following items are disclosed in the specification:

(1) A winding-up method for winding up a magnetic tape, comprising the steps of:
winding up the magnetic tape around a takeup reel by laying turns one on top of another while causing the magnetic tape to run; and
performing a tension control of maintaining tension exerted on a wound-up magnetic tape for a predetermined time.

(2) The winding-up method of item (1), wherein the tension control is performed for 5 seconds or more.

(3) The winding-up method of item (1) or (2), wherein the magnetic tape is such that a surface of a back coat layer is formed with projections whose heights as measured by an atomic force microscope are smaller than or equal to 100 nm and the density of projections that are formed on the surface of the back coat layer and whose heights as measured by an atomic force microscope are 25 to 100 nm is 23 to 1,000 per 90-µm square.

(4) A winding-up method for winding up a magnetic tape, comprising the steps of:
winding up the magnetic tape around a takeup reel by laying turns one on top of another while causing the magnetic tape to run; and
performing a running speed control of setting a running speed of the magnetic tape lower than a threshold speed.

(5) The winding-up method of item (4), wherein the running speed control is performed on only a part, to become outer peripheral turns of a wound-up magnetic tape, of the magnetic tape.

(6) A manufacturing method of a magnetic tape cartridge, wherein:
a tape reel around which a magnetic tape has been wound up by the winding-up method of any one of items (1) to (5) is incorporated in a cartridge; or
a magnetic tape is wound up around a tape reel incorporated in a cartridge in advance by the winding-up method of any one of items (1) to (5).

(7) A winding-up apparatus for winding up a magnetic tape, comprising:
a winding-up mechanism for winding up the magnetic tape around a takeup reel by laying turns one on top of another while causing the magnetic tape to run; and
a control unit for performing a tension control of maintaining tension exerted on a wound-up magnetic tape for a predetermined time or a running speed control of setting a running speed of the magnetic tape lower than a threshold speed during winding.

(8) A magnetic tape cartridge to incorporate a magnetic tape, comprising:
a cartridge body;
a tape reel which is housed in the cartridge body and around which the magnetic tape is to be wound up; and
a storage unit which is disposed in the cartridge body, is capable of wireless communication, and is stored with information which can be read by the winding-up apparatus according to item (7) and indicating a type of the magnetic tape.

(9) The magnetic tape cartridge of item (8), wherein:
the magnetic tape has a layered structure including at least a magnetic layer, a non-magnetic layer, and a back coat layer;
one surface of the magnetic tape is a surface of the magnetic layer and the other surface of the magnetic tape is a surface of the back coat layer; and
the information indicating the type of the magnetic tape includes information indicating roughness of the surface of the back coat layer.

What is claimed is:

1. A winding-up method for winding up a magnetic tape, comprising:
providing the magnetic tape between a supply reel and a takeup reel, wherein a tension adjusting unit is located between the supply reel and the takeup reel and is equipped with a rotatable roller in sliding contact with a surface of the magnetic tape;
providing a first drive unit capable of unwinding the magnetic tape by rotating the supply reel;
providing a second drive unit capable of driving the tension adjusting unit to exert tension or release tension on a running portion of the magnetic tape;
providing a third drive unit capable of winding the magnetic tape by rotating the takeup reel;
providing a programmed electrical control unit capable of controlling the operation of the first, second and third drive units;
winding up the magnetic tape around the takeup reel by driving the supply reel, the tension adjusting unit and the takeup reel thus laying turns one on top of another while causing the magnetic tape to run, the control unit controlling the running speed of the magnetic tape by controlling the first and third drive units, respectively, and the control unit maintaining a desired tension on the magnetic tape by controlling the second drive unit;
detecting when a predetermined running length of the magnetic tape has been wound-up around the takeup reel, and stopping the winding up around the takeup reel by means of the control unit programmed to stop the winding up of the magnetic tape;
maintaining tension on the magnetic tape for a predetermined time of 5 seconds or more wherein the predetermined time starts at a time at which the winding up of the magnetic tape is stopped by means of the control unit programmed to control the tension exerted on the magnetic tape by the tension adjusting unit to a predetermined value during said predetermined time.

2. The winding-up method according to claim 1, wherein the magnetic tape is such that a surface of a back coat layer is formed with projections whose heights as measured by an atomic force microscope are smaller than or equal to 100 nm and a density of projections that are formed on a surface of the back coat layer and whose heights as measured by an atomic force microscope are 25 to 100 nm is 23 to 1,000 per 90-μm square.

3. A manufacturing method of a magnetic tape cartridge, comprising:
incorporating the takeup reel around which the magnetic tape has been wound up by the winding-up method according to claim 1, into a cartridge; or
incorporating the takeup reel around which the magnetic tape is to be wound up into a cartridge, and then carrying out the winding-up method according to claim 1.

4. A winding-up apparatus for winding up a magnetic tape, comprising:
the magnetic tape between a supply reel and a takeup reel;
a tension adjusting unit located between the supply reel and the takeup reel which is equipped with a rotatable roller in sliding contact with a surface of the magnetic tape;
at least one drive unit for winding up the magnetic tape around a takeup reel by laying turns one on top of another while causing the magnetic tape to run; said at least one drive unit comprising:
a first drive unit capable of unwinding the magnetic tape by rotating the supply reel;
a second drive unit capable of driving the tension adjusting unit to exert tension or release tension on a running portion of the magnetic tape;
a third drive unit capable of winding the magnetic tape by rotating the takeup reel;
a programmed electrical control unit capable of controlling the running speed of the magnetic tape by controlling the operation of the first, second and third drive units, detecting when a predetermined running length of the magnetic tape has been wound-up around the takeup reel, stopping the winding up around the takeup reel, and maintaining tension exerted on the magnetic tape wound-up around the takeup reel for a predetermined time of 5 seconds or more,
wherein the predetermined time starts at a time at which the winding up of the magnetic tape is stopped, and,
wherein the control unit is programmed to stop the winding up of the magnetic tape upon detecting when said predetermined running length of the magnetic tape has been wound-up around the takeup reel, and to control the tension exerted on the magnetic tape by the tension adjusting unit to a predetermined value during said predetermined time.

5. A magnetic tape cartridge to incorporate a magnetic tape, comprising:
a cartridge body;
a takeup reel which is housed in the cartridge body and around which the magnetic tape is to be wound up; and
a storage unit which is disposed in the cartridge body, is capable of wireless communication, and is stored with information which is used in combination with a winding-up apparatus according to claim 4 and indicating a type of the magnetic tape.

6. The magnetic tape cartridge according to claim 5, wherein:

the magnetic tape has a layered structure including at least a magnetic layer, a non-magnetic layer, and a back coat layer;
one surface of the magnetic tape is a surface of the magnetic layer and other surface of the magnetic tape is a surface of the back coat layer; and
the information indicating the type of the magnetic tape includes information indicating roughness of the surface of the back coat layer.

7. A winding-up method for winding up a magnetic tape, comprising:
providing the magnetic tape between a supply reel and a takeup reel, wherein a tension adjusting unit is located between the supply reel and the takeup reel and is equipped with a rotatable roller in sliding contact with a surface of the magnetic tape;
providing a first drive unit capable of unwinding the magnetic tape by rotating the supply reel;
providing a second drive unit capable of driving the tension adjusting unit to exert tension or release tension on a running portion of the magnetic tape;
providing a third drive unit capable of winding the magnetic tape by rotating the takeup reel;
providing a programmed electrical control unit capable of controlling the operation of the first, second and third drive units;
winding up the magnetic tape around the takeup reel by driving the supply reel, the tension adjusting unit and the takeup reel thus laying turns one on top of another while causing the magnetic tape to run, the control unit controlling the running speed of the magnetic tape by controlling the first and third drive units, respectively, and the control unit maintaining a desired tension on the magnetic tape by controlling the second drive unit;
detecting when a predetermined running length of the magnetic tape has been wound-up around the takeup reel, and stopping the winding up around the takeup reel by means of the control unit programmed to stop the winding up of the magnetic tape;
maintaining tension exerted on a plurality of parts of the magnetic tape for a predetermined time of 5 seconds or more, wherein the predetermined time for each of the plurality of parts of the magnetic tape is an individual time which starts at a time at which the winding up of the magnetic tape is stopped
by means of the control unit programmed to control the tension exerted on the magnetic tape by the tension adjusting unit to a predetermined value during said predetermined time.

8. The winding-up method according to claim 7, wherein the predetermined time for each of the plurality of parts of the magnetic tape is 5 seconds or more.

9. The winding-up method according to claim 7, wherein the magnetic tape is such that a surface of a back coat layer is formed with projections whose heights as measured by an atomic force microscope are smaller than or equal to 100 nm and a density of projections that are formed on a surface of the back coat layer and whose heights as measured by an atomic force microscope are 25 to 100 nm is 23 to 1,000 per 90-μm square.

10. The winding-up method according to claim 8, wherein the magnetic tape is such that a surface of a back coat layer is formed with projections whose heights as measured by an atomic force microscope are smaller than or equal to 100 nm and a density of projections that are formed on a surface of the back coat layer and whose heights as measured by an atomic force microscope are 25 to 100 nm is 23 to 1,000 per 90-μm square.

11. A manufacturing method of a magnetic tape cartridge, comprising:

incorporating the takeup reel around which the magnetic tape has been wound up by the winding-up method according to claim 7, into a cartridge; or incorporating the takeup reel around which the magnetic tape is to be wound up into a cartridge, and then carrying out the winding-up method according to claim 7.

12. A winding-up apparatus for winding up a magnetic tape, comprising:

the magnetic tape between a supply reel and a takeup reel, a tension adjusting unit located between the supply reel and the takeup reel which is equipped with a rotatable roller in sliding contact with a surface of the magnetic tape;

at least one drive unit for winding up the magnetic tape around a takeup reel by laying turns one on top of another while causing the magnetic tape to run; said at least one drive unit comprising:

a first drive unit capable of unwinding the magnetic tape by rotating the supply reel;

a second drive unit capable of driving the tension adjusting unit to exert tension or release tension on a running portion of the magnetic tape;

a third drive unit capable of winding the magnetic tape by rotating the takeup reel;

a programmed electrical control unit capable of controlling the running speed of the magnetic tape by controlling the operation of the first, second and third drive units, detecting when a predetermined running length of the magnetic tape has been wound-up around the takeup reel, stopping the winding up around the takeup reel, and maintaining tension exerted on a plurality of parts of the magnetic tape wound-up around the takeup reel for a predetermined time of 5 seconds or more, wherein the predetermined time for each of the plurality of parts of the magnetic tape is an individual time which starts at a time at which the winding up of the magnetic tape is stopped, and, wherein the control unit is programmed to stop the winding up of the magnetic tape upon detecting when said predetermined running length of the magnetic tape has been wound-up around the takeup reel, and to control the tension exerted on the magnetic tape by the tension adjusting unit to a predetermined value during said predetermined time.

13. The winding-up method according to claim 1, wherein the second drive unit is a separate unit from each of the first drive unit and the third drive unit.

14. The winding-up method according to claim 7, wherein the second drive unit is a separate unit from each of the first drive unit and the third drive unit.

* * * * *